(12) United States Patent
Chen

(10) Patent No.: US 10,384,707 B2
(45) Date of Patent: Aug. 20, 2019

(54) ROBOT SWING STRUCTURE

(71) Applicant: ROBOTELF TECHNOLOGY CO., LTD., Taipei (TW)

(72) Inventor: Ling-Feng Chen, Taipei (TW)

(73) Assignee: ROBOTELF TECHNOLOGY CO., LTD., Taipei (TW)

( * ) Notice: Subject to any disclaimer, the term of this patent is extended or adjusted under 35 U.S.C. 154(b) by 287 days.

(21) Appl. No.: 15/629,763

(22) Filed: Jun. 22, 2017

(65) Prior Publication Data

US 2018/0370557 A1    Dec. 27, 2018

(51) Int. Cl.
*F16H 19/04* (2006.01)
*B62D 1/18* (2006.01)
*E05F 15/619* (2015.01)

(52) U.S. Cl.
CPC .............. *B62D 1/18* (2013.01); *E05F 15/619* (2015.01); *F16H 19/04* (2013.01); *E05Y 2201/71* (2013.01); *E05Y 2201/722* (2013.01); *F16H 2019/046* (2013.01)

(58) Field of Classification Search
CPC ........... B62D 1/18; F05F 15/619; F16H 19/04
See application file for complete search history.

(56) References Cited

U.S. PATENT DOCUMENTS

| | | | | |
|---|---|---|---|---|
| 4,663,925 A * | 5/1987 | Terada | ............... | A01D 46/24 |
| | | | | 382/153 |
| 5,174,168 A * | 12/1992 | Takagi | ............... | B25J 9/104 |
| | | | | 74/109 |
| 5,346,351 A * | 9/1994 | Priolo | ............... | B07C 3/008 |
| | | | | 209/584 |
| 7,752,939 B2 * | 7/2010 | Ono | ............... | B25J 9/042 |
| | | | | 74/490.03 |
| 8,511,198 B2 * | 8/2013 | Zhang | ............... | B25J 9/046 |
| | | | | 74/490.04 |
| 8,529,136 B2 * | 9/2013 | Liu | ............... | F16C 33/62 |
| | | | | 384/492 |
| 8,849,455 B2 * | 9/2014 | Izumi | ............... | B25J 9/1641 |
| | | | | 700/245 |
| 8,893,568 B2 * | 11/2014 | Katayama | ............... | F16H 19/04 |
| | | | | 184/102 |
| 8,961,537 B2 * | 2/2015 | Leung | ............... | B25J 9/1689 |
| | | | | 606/130 |

* cited by examiner

*Primary Examiner* — David M Fenstermacher
(74) *Attorney, Agent, or Firm* — Leong C. Lei

(57) ABSTRACT

A robot swing structure uses a swing bracket to be in combination with a curved rack, and a transmission gear of a power mechanism to be in engagement with the curved rack. Whereby, when a first end of the curved rack is positioned at the transmission gear, the curved rack and swing bracket are allowed to be swung to incline downward (as if the robot head lowers or bows); when a second end of the curved rack is positioned at the transmission gear, the curved rack and swing bracket are allowed to be in a transverse state; and when a stop section of the curved rack is positioned at the transmission gear, the curved rack and swing bracket are allowed to be in a upright state, thereby making the curved rack and swing bracket to have three swing stopping states.

4 Claims, 4 Drawing Sheets

ROBOT SWING STRUCTURE

(a) TECHNICAL FIELD OF THE INVENTION

The present invention relates to a robot swing structure, and more particularly to a robot swing structure used to drive a robot head to swing, in which a power mechanism is configured on a robot device, and a swing bracket in combination with a curved rack the robot head, with a transmission gear configured on the power mechanism in engagement with the curved rack; when a first end of the curved rack is positioned at the transmission gear, allowing the curved rack and swing rack to be inclined downward to make the robot head face downward as if the robot lowers the head or bows.

(b) DESCRIPTION OF THE PRIOR ART

To make home life more convenient and safe, the designers and manufacturers has been gradually paid much attention to home-based intelligent robot R & D and demand; fore example, home-based intelligent robots can be used not only for home monitoring (such as, intruder monitoring, environment and temperature monitoring, and cleaning), but also for life management (such as, reminders of important matters, weather forecasts, and accompanying care or emergency notice) such that human life can be more convenient for sure by introducing robots into home management.

In order to make hone-based intelligent robots to be more humanized and have more speech and action simulation, and more importantly, to have better interaction with mankind, the current robots are mostly installed with a touch screen on the heads thereof. With the touch screen, message and information can be displayed, and a user can control directly the robot in a touch way. However, it is bound to cause the weight of the robot head to be increased, leaving the swing performance insufficient and not smooth when the screen or other device is installed on the robot head.

SUMMARY OF THE INVENTION

The present invention proposes a robot swing structure, utilizing a swing bracket to be in combination with a curved rack, and a transmission gear of a power mechanism to be in engagement with the curved rack. Whereby, when a first end of the curved rack is positioned at the transmission gear, the curved rack and swing bracket are allowed to be swung to incline downward (as if the robot head lowers or bows); when a second end of the curved rack is positioned at the transmission gear, the curved rack and swing bracket are allowed to be in a transverse state; and when a stop section of the curved rack is positioned at the transmission gear, the curved rack and swing bracket are allowed to be in a upright state, thereby making the curved rack and swing bracket to have three swing stopping states. In addition, the power mechanism adapted to drive the curved rack to swing enhances the weight-bearing capacity of the swing bracket, and can be achieved without needing a large-scale motor or high torque motor.

DETAILED DESCRIPTION OF THE PREFERRED EMBODIMENTS

Figure 1:
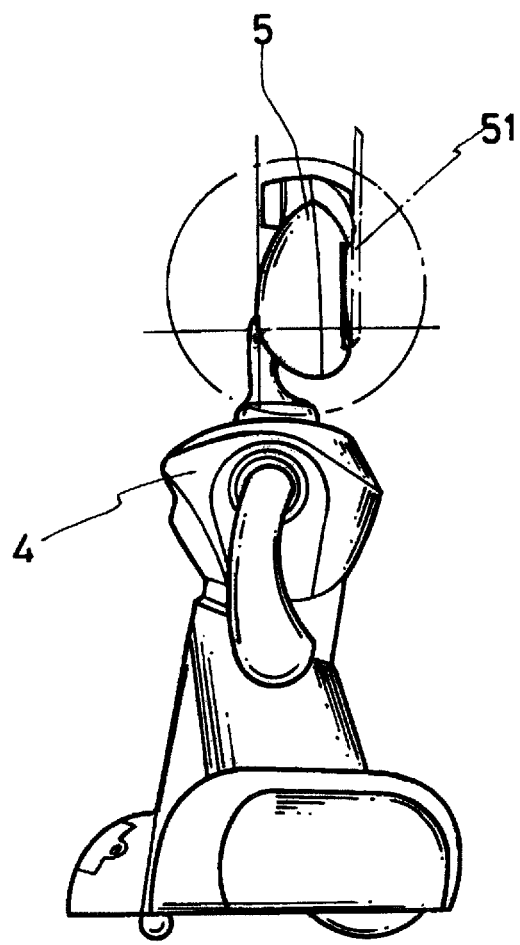
FIG. 1 is a schematic view of a robot swing structure of the present invention upon implementation on a robot.

Referring to FIGS. 1 to 5, a robot swing structure especially adapted to drive a robot head 5 to swing includes a power mechanism 1, swing bracket 2 and curved rack 3.

The power mechanism 1 is configured on a robot device 4 and adapted to drive the robot head 5 to swing. The power mechanism 1 is in combination with a transmission gear 11 and drives it to rotate.

The swing bracket 2 is in combination with the robot head 5, and one side wall of the swing bracket 2 is configured with a plurality of locking portions 21. Furthermore, the position (e.g. the face) of the swing bracket 2 facing the outside of the robot head 5 is configured with a fixture 22. Furthermore, the robot head 5 has an electronic device 51 capable of in combination with the fixture 22 of the swing bracket 2, where the swing bracket drives the robot head 5 and electronic device 51 to swing, where the electronic device 51 may be an electronic device with a touch screen (e.g. tablet or smart phone).

Furthermore, the curved rack 3 is vertically combined to the swing bracket 2 and configured with a plurality of locking hole 31 corresponding to the plurality of locking portions 21 of the swing bracket 2, and the locking holes 31 and locking portions 21 are locked together through preset locking elements (e.g. screws), allowing the curved rack 3 to be fixed to the swing bracket 2. Furthermore, a first end 32 is defined on one end of the curved rack 3, a second end 3 another end thereof, and a stop section 34 adjacent to the first end 32 is configured between the first end 32 and second end 33.

Figure 2:
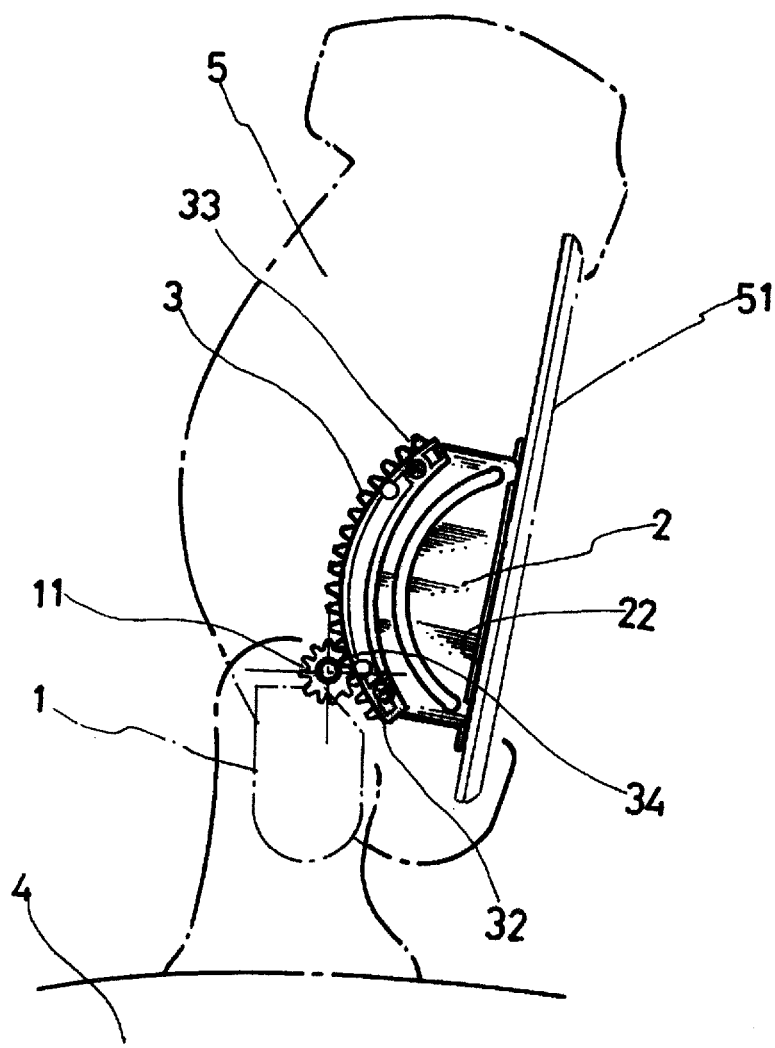
FIG. 2 is a side view of the robot swing structure of the present invention.
Figure 3:
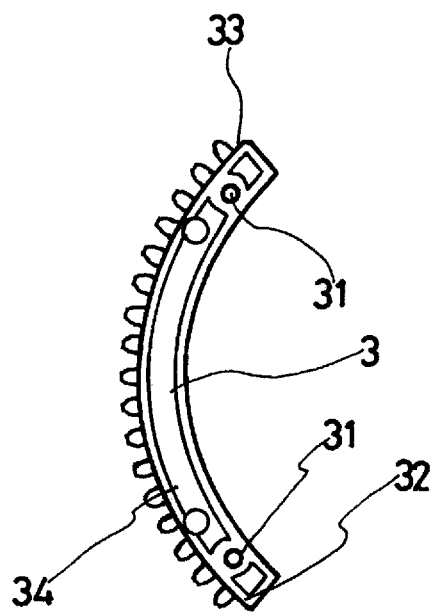
FIG. 3 is a schematic view of a curved rack of the robot swing structure of the present invention.
Figure 4:
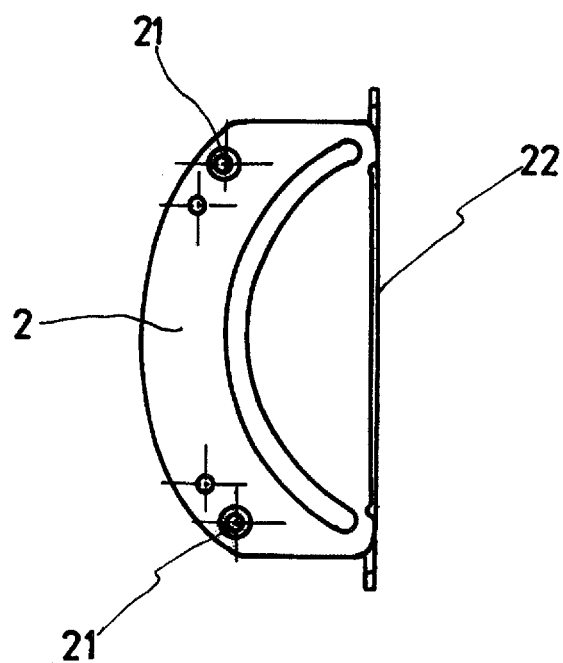
FIG. 4 is a schematic view of a swing bracket of the robot swing structure of the present invention.
Figure 5:
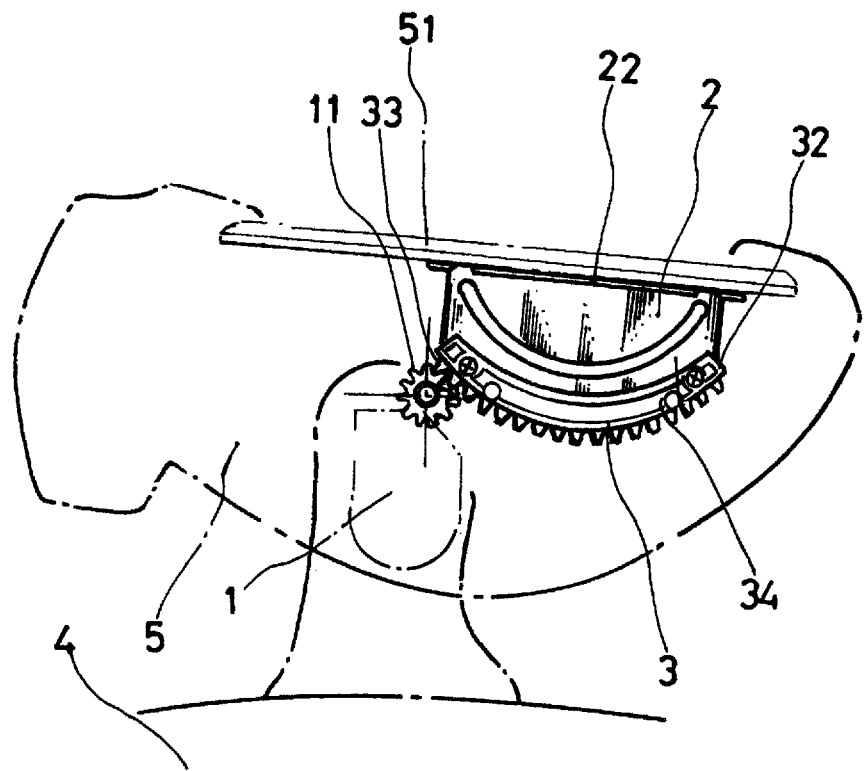
FIG. 5 is a schematic view of the robot swing structure of the present invention in an action state.

Finally, the robot head 5 is in combination with the robot device 4, which is not the technical feature of the present invention such that the detail thereof is omitted here. Whereby, with the swing bracket 2 in combination with the curved rack 3 and further through the engagement of the transmission gear 11 of the power mechanism 1 with the curved gear 3, the power mechanism 1 drives the transmission gear 11 to drive the curved rack 3 to swing; when the first end 32 of the curved rack 3 is positioned at the transmission gear 11, the curved rack 3 and swing bracket 2 are swung to incline downward (as if the robot head lowers or bows); when the second end 33 of the curved rack 3 is positioned at the transmission gear 11, the curved rack 3 and swing racket 2 are allowed to be in a transverse state, as FIG. 5 shows; and further, when the stop section 34 of the curved rack 3 is positioned at the transmission gear 11, the curved rack 3 and swing rack 2 are allowed to be in a upright state, as FIG. 2 shows, thereby allowing the curved rack 3 and swing bracket 2 to be stopped swinging at three positions. Furthermore, the transmission gear 11 of the power mechanism 1 used to drive the curved rack 3 can enhance the weight-bearing capacity of the swing bracket 2 without needing a large-scale motor of high torque motor to drive the curved rack 3 and swing bracket 2 to swing to drive the robot head 5 to be swing vertically.

I claim:

1. A robot swing structure, particularly adapted to drive a robot head to swing, said robot swing structure comprising:

a power mechanism, configured on a robot device, adapted to drive said robot head to swing, and in combination with a transmission gear, said power mechanism driving said transmission gear to rotate;

a swing bracket, configured on said robot head; and a curved rack, vertically combined to said swing bracket, a first end defined on one end of said curved rack and a second end another end thereof, a stop section further configured between said first end and second end, said stop section adjacent to said first end, said curved rack in engagement with said transmission gear of said power mechanism, and said power mechanism driving said curved rack to swing:

whereby, when said first end of said curved rack is positioned at said transmission gear, said curved rack and swing bracket are allowed to be swung to incline downward; when said second end of said curved rack is positioned at said transmission gear, said curved rack and swing bracket are allowed to be in a transverse state; and when said stop section of said curved rack is positioned at said transmission gear, said curved rack and swing bracket are allowed to be in a upright state.

2. The structure according to claim 1, wherein a plurality of locking portions are configured on one side wall of said swing bracket, a plurality of locking holes said curved rack, said plurality of locking holes and said plurality of locking portions correspond to each other and are locked together with preset locking elements.

3. The structure according to claim 1, wherein an electronic device is configured on said robot head, a fixture a position of said swing bracket facing the outside of said robot head, and said electronic device is in combination with said fixture.

4. The structure according to claim 3, wherein said electronic device is an electronic device with a touch screen.

* * * * *